(12) United States Patent
Fortier et al.

(10) Patent No.: US 11,637,285 B2
(45) Date of Patent: Apr. 25, 2023

(54) OVER-LITHIATED CATHODE MATERIAL

(71) Applicant: GM GLOBAL TECHNOLOGY OPERATIONS LLC, Detroit, MI (US)

(72) Inventors: Mary E. Fortier, Troy, MI (US); Bing Tan, Ann Arbor, MI (US); Li Yang, Troy, MI (US); Umamaheswari Viswanathan, Troy, MI (US); Vijay P. Saharan, Grand Blanc, MI (US); Sherman H. Zeng, Troy, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 291 days.

(21) Appl. No.: 17/062,358

(22) Filed: Oct. 2, 2020

(65) Prior Publication Data

US 2022/0109151 A1    Apr. 7, 2022

(51) Int. Cl.
   *H01M 4/525*   (2010.01)
   *H01M 4/505*   (2010.01)
   (Continued)

(52) U.S. Cl.
   CPC .......... *H01M 4/525* (2013.01); *H01M 4/386* (2013.01); *H01M 4/505* (2013.01);
   (Continued)

(58) Field of Classification Search
   CPC ...... H01M 4/252; H01M 4/386; H01M 4/505; H01M 10/0525; H01M 2004/027; H01M 2004/028
   See application file for complete search history.

(56) References Cited

U.S. PATENT DOCUMENTS

| 2014/0058598 | A1* | 2/2014 | Matsui | .......... | H01M 4/505 |
| | | | | | 429/223 |
| 2014/0099552 | A1* | 4/2014 | Chung | .......... | H01M 4/364 |
| | | | | | 252/182.1 |

(Continued)

FOREIGN PATENT DOCUMENTS

| CN | 111725487 A | * | 9/2020 |
| CN | 114388774 A | | 4/2022 |

(Continued)

OTHER PUBLICATIONS

Machine Translation of CN-111725487-A (Sep. 12, 2022) (Year: 2022).*

(Continued)

*Primary Examiner* — Matthew J Merkling
(74) *Attorney, Agent, or Firm* — Harness, Dickey & Pierce, P.L.C.

(57) ABSTRACT

The present disclosure relates to over-lithiated positive electroactive materials for use within an electrochemical cell. For example, the electrochemical cell includes a positive electrode that includes an over-lithiated positive electroactive material that includes one of $Li_xMn_2O_4$ (where $1.05 \le x \le 1.30$) and $LiMn_{(2-x)}Ni_xO_4$ (where $0 \le x \le 0.5$). The electrochemical cell can include a negative electrode that includes a silicon-containing negative electroactive material having a Columbic Efficiency greater than or equal to about 80% and less than or equal to about 90%.

11 Claims, 1 Drawing Sheet

(51) Int. Cl.
  *H01M 10/0525*   (2010.01)
  *H01M 4/38*   (2006.01)
  *H01M 4/02*   (2006.01)

(52) U.S. Cl.
  CPC .. *H01M 10/0525* (2013.01); *H01M 2004/027* (2013.01); *H01M 2004/028* (2013.01)

(56) References Cited

U.S. PATENT DOCUMENTS

2019/0252684 A1*  8/2019  Yang .................. H01M 4/0404
2020/0036035 A1*  1/2020  Hao ................... H01M 10/0525
2020/0227738 A1*  7/2020  Wang .................. H01M 4/134

FOREIGN PATENT DOCUMENTS

DE        102021112023 A1    4/2022
EP             3879605 A1 *  9/2021   ........... C01B 33/325

OTHER PUBLICATIONS

Mancini, Marilena et al., "A High-Voltage and High-Capacity Li1+xNi0.5Mn1.5O4 Cathode Material: From Synthesis to Full Lithium-Ion Cells," ChemSuChem (2016), 9, pp. 1843-1849; (Published online: Jun. 6, 2016) DOI: 10.1002/cssc.201600365.

* cited by examiner

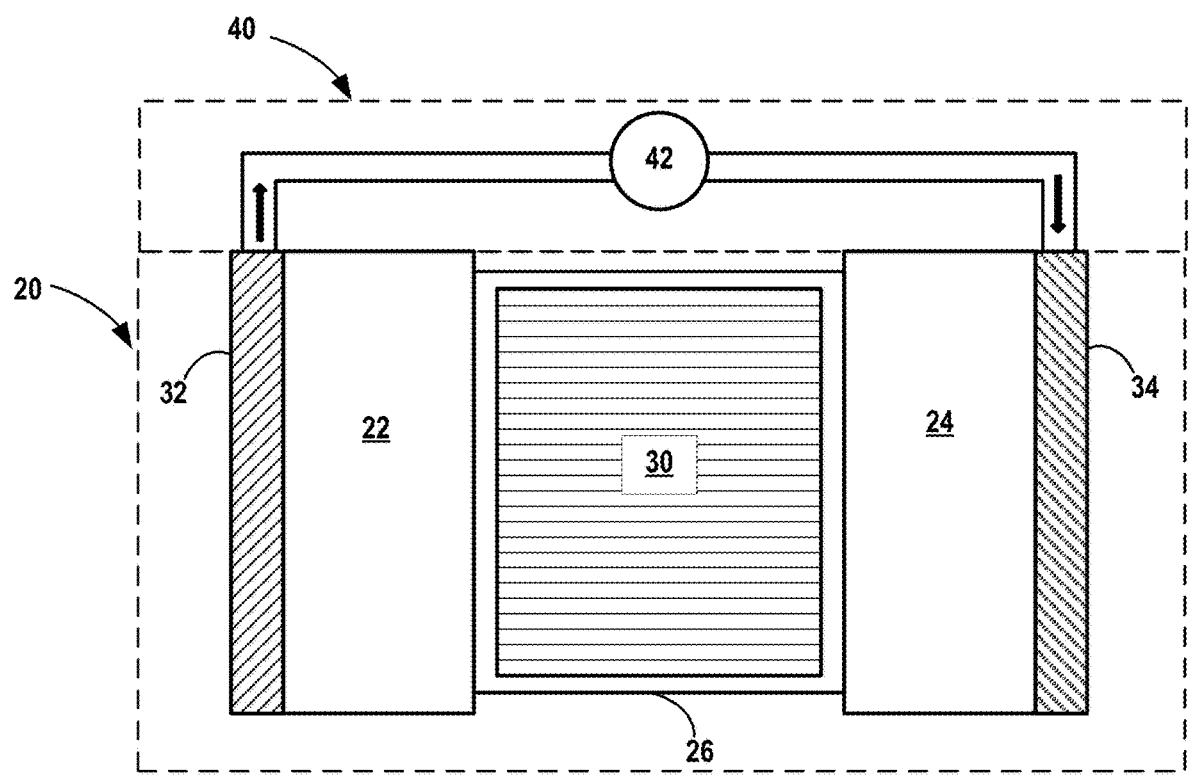

OVER-LITHIATED CATHODE MATERIAL

INTRODUCTION

This section provides background information related to the present disclosure which is not necessarily prior art.

Advanced energy storage devices and systems are in demand to satisfy energy and/or power requirements for a variety of products, including automotive products such as start-stop systems (e.g., 12V start-stop systems), battery-assisted systems, hybrid electric vehicles ("HEVs"), and electric vehicles ("EVs"). Typical lithium-ion batteries include at least two electrodes and an electrolyte and/or separator. One of the two electrodes may serve as a positive electrode or cathode and the other electrode may serve as a negative electrode or anode. A separator and/or electrolyte may be disposed between the negative and positive electrodes. The electrolyte is suitable for conducting lithium ions between the electrodes and, like the two electrodes, may be in solid and/or liquid form and/or a hybrid thereof. In instances of solid-state batteries, which include solid-state electrodes and a solid-state electrolyte, the solid-state electrolyte may physically separate the electrodes so that a distinct separator is not required.

Conventional rechargeable lithium-ion batteries operate by reversibly passing lithium ions back and forth between the negative electrode and the positive electrode. For example, lithium ions may move from the positive electrode to the negative electrode during charging of the battery, and in the opposite direction when discharging the battery. Such lithium-ion batteries can reversibly supply power to an associated load device on demand. More specifically, electrical power can be supplied to a load device by the lithium-ion battery until the lithium content of the negative electrode is effectively depleted. The battery may then be recharged by passing a suitable direct electrical current in the opposite direction between the electrodes.

During discharge, the negative electrode may contain a comparatively high concentration of intercalated lithium, which is oxidized into lithium ions and electrons. Lithium ions may travel from the negative electrode to the positive electrode, for example, through the ionically conductive electrolyte solution contained within the pores of an interposed porous separator. Concurrently, electrons pass through an external circuit from the negative electrode to the positive electrode. Such lithium ions may be assimilated into the material of the positive electrode by an electrochemical reduction reaction. The battery may be recharged or regenerated after a partial or full discharge of its available capacity by an external power source, which reverses the electrochemical reactions that transpired during discharge.

In various instances, however, a portion of the intercalated lithium remains with the negative electrode following the first cycle due to, for example, conversion reactions and/or the formation of a solid electrolyte interphase (SEI) layer on the negative electrode during the first cycle, as well as ongoing lithium loss due to, for example, continuous solid electrolyte interphase breakage. Such permanent loss of lithium ions may result in a decreased specific energy and power in the battery resulting from, for example, added positive electrode mass that does not participate in the reversible operation of the battery. For example, the lithium-ion battery may experience an irreversible capacity loss of greater than or equal to about 5% and less than or equal to about 30% after the first cycle, and in the instance of silicon-containing negative electrodes, an irreversible capacity loss of greater than or equal to about 20% and less than or equal to about 40% after the first cycle.

Current methods to compensate for first cycle lithium loss include, for example, electrochemical processes where a silicon-containing anode is lithiated using an electrolyte bath. However, such processes are susceptible to electrolyte pollution, and as a result, instability. Another method of compensation includes, for example, in-cell lithiation, which includes adding lithium to a cell. Such processes, however, require the use of mesh current collectors, which have high material costs, as well as coating costs. Yet another method of compensation includes, for example, the deposition of lithium on an anode. However, in such instances, it is difficult (and costly) to produce evenly deposited lithium layers. Accordingly, it would be desirable to develop improved electrodes and electroactive materials, and methods of making and using the same, that can address these challenges.

SUMMARY

This section provides a general summary of the disclosure, and is not a comprehensive disclosure of its full scope or all of its features.

The present disclosure relates to over-lithiated positive electroactive materials for use within an electrochemical cell that cycles lithium ions.

In various aspects, the present disclosure provides an electrochemical cell that cycles lithium ions. The electrochemical cell includes a positive electrode, a negative electrode, and an electrolyte disposed between the negative electrode and the positive electrode. The positive electrode includes an over-lithiated positive electroactive material that includes one of $Li_xMn_2O_4$ (where $1.05 \leq x \leq 1.30$) and $LiMn_{(2-x)}Ni_xO_4$ (where $0 \leq x \leq 0.5$). The negative electrode includes a negative electroactive material having a Columbic Efficiency greater than or equal to about 80% and less than or equal to about 90%.

In one aspect, the over-lithiated positive electroactive material includes $Li_xMn_2O_4$, where $1.05 \leq x \leq 1.20$.

In one aspect, the over-lithiated positive electroactive material has a Columbic Efficiency less than or equal to about 90%.

In one aspect, the Columbic Efficiency of the negative electroactive material is a first Columbic Efficiency and the over-lithiated positive electroactive material has a second Columbic Efficiency, and the first and second Columbic Efficiencies are substantially the same.

In one aspect, the negative electrode includes a silicon-containing electroactive material.

In one aspect, when the negative electroactive material includes a pyrolyzed silicon and the over-lithiated positive electroactive material includes $Li_xMn_2O_4$, where $1.05 \leq x \leq 1.15$, the over-lithiated positive electroactive material may have a Columbic Efficiency of about 90%.

In one aspect, when the negative electroactive material includes one of blended silicon-graphite and a blended silicon oxide-graphite and the over-lithiated positive electroactive material includes $Li_xMn_2O_4$, where $1.20 \leq x \leq 1.30$, the over-lithiated positive electroactive material may have a Columbic Efficiency of greater than or equal to about 80% and less than or equal to about 82%.

In one aspect, theoretical charge capacity is defined by:

$$\frac{26.8x}{173.9 + 6.9x}$$

In various aspects, the present disclosure provides an electrochemical cell that cycles lithium ions. The electrochemical cell includes a positive electrode, a negative electrode, and an electrolyte disposed between the negative electrode and the positive electrode. The positive electrode includes an over-lithiated positive electroactive material that includes one of $Li_xMn_2O_4$ (where $1.05 \leq x \leq 1.30$) and $LiMn_{(2-x)}Ni_xO_4$ (where $0 \leq x \leq 0.5$). The negative electrode includes a silicon-containing electroactive material.

In one aspect, the over-lithiated positive electroactive material includes $Li_xMn_2O_4$, where $1.05 \leq x \leq 1.20$.

In one aspect, the over-lithiated positive electroactive material has a Columbic Efficiency less than or equal to about 90%.

In one aspect, the silicon-containing electroactive material has a first Columbic Efficiency and the over-lithiated positive electroactive material has a second Columbic Efficiency, and the first and second Columbic Efficiencies are substantially the same.

In one aspect, when the silicon-containing electroactive material includes pyrolyzed silicon and the over-lithiated positive electroactive material comprises $Li_xMn_2O_4$, where $1.05 \leq x \leq 1.15$, the over-lithiated positive electroactive material may have a Columbic Efficiency of about 90%.

In one aspect, when the silicon-containing electroactive material includes one of blended silicon-graphite and a blended silicon oxide-graphite and the over-lithiated positive electroactive material comprises $Li_xMn_2O_4$, where $1.20 \leq x \leq 1.30$, the over-lithiated positive electroactive material may have a Columbic Efficiency of greater than or equal to about 80% and less than or equal to about 82%.

In various aspects, the present disclosure provides an electrochemical cell that cycles lithium ions. The electrochemical cell includes a positive electrode, a negative electrode, and an electrolyte disposed between the negative electrode and the positive electrode. The positive electrode includes an over-lithiated positive electroactive material having a first Columbic efficiency. The negative electrode includes a silicon-containing electroactive material having a second Columbic Efficiency. The first and second Columbic Efficiencies may be the same.

In one aspect, the over-lithiated positive electroactive material includes $Li_xMn_2O_4$, where $1.05 \leq x \leq 1.30$.

In one aspect, the over-lithiated positive electroactive material includes $Li_xMn_2O_4$, where $1.05 \leq x \leq 1.20$.

In one aspect, when the silicon-containing electroactive material includes pyrolyzed silicon and the over-lithiated positive electroactive material includes $Li_xMn_2O_4$, where $1.05 \leq x \leq 1.15$, the over-lithiated positive electroactive material may have a Columbic Efficiency of about 90%.

In one aspect, when the silicon-containing electroactive material includes one of blended silicon-graphite and a blended silicon oxide-graphite and the over-lithiated positive electroactive material comprises $Li_xMn_2O_4$, where $1.20 \leq x \leq 1.30$, the over-lithiated positive electroactive material may have a Columbic Efficiency of greater than or equal to about 80% and less than or equal to about 82%.

In one aspect, the over-lithiated positive electroactive material may include $LiMn_{(2-x)}Ni_xO_4$ (where $0 \leq x \leq 0.5$).

Further areas of applicability will become apparent from the description provided herein. The description and specific examples in this summary are intended for purposes of illustration only and are not intended to limit the scope of the present disclosure.

BRIEF DESCRIPTION OF THE DRAWINGS

The drawing described herein is for illustrative purposes only of selected embodiments and not all possible implementations, and is not intended to limit the scope of the present disclosure.

FIG. 1 is a schematic of an example electrochemical battery cell.

DETAILED DESCRIPTION

Example embodiments are provided so that this disclosure will be thorough, and will fully convey the scope to those who are skilled in the art. Numerous specific details are set forth such as examples of specific compositions, components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, elements, compositions, steps, integers, operations, and/or components, but do not preclude the presence or addition of one or more other features, integers, steps, operations, elements, components, and/or groups thereof. Although the open-ended term "comprising," is to be understood as a non-restrictive term used to describe and claim various embodiments set forth herein, in certain aspects, the term may alternatively be understood to instead be a more limiting and restrictive term, such as "consisting of" or "consisting essentially of." Thus, for any given embodiment reciting compositions, materials, components, elements, features, integers, operations, and/or process steps, the present disclosure also specifically includes embodiments consisting of, or consisting essentially of, such recited compositions, materials, components, elements, features, integers, operations, and/or process steps. In the case of "consisting of," the alternative embodiment excludes any additional compositions, materials, components, elements, features, integers, operations, and/or process steps, while in the case of "consisting essentially of," any additional compositions, materials, components, elements, features, integers, operations, and/or process steps that materially affect the basic and novel characteristics are excluded from such an embodiment, but any compositions, materials, components, elements, features, integers, operations, and/or process steps that do not materially affect the basic and novel characteristics can be included in the embodiment.

Any method steps, processes, and operations described herein are not to be construed as necessarily requiring their performance in the particular order discussed or illustrated, unless specifically identified as an order of performance. It is also to be understood that additional or alternative steps may be employed, unless otherwise indicated.

When a component, element, or layer is referred to as being "on," "engaged to," "connected to," or "coupled to" another element or layer, it may be directly on, engaged, connected or coupled to the other component, element, or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various steps, elements, components, regions, layers and/or sections, these steps, elements, components, regions, layers and/or sections should not be limited by these terms, unless otherwise indicated. These terms may be only used to distinguish one step, element, component, region, layer or section from another step, element, component, region, layer or section. Terms such as "first," "second," and other numerical terms when used herein do not imply a sequence or order unless clearly indicated by the context. Thus, a first step, element, component, region, layer or section discussed below could be termed a second step, element, component, region, layer or section without departing from the teachings of the example embodiments.

Spatially or temporally relative terms, such as "before," "after," "inner," "outer," "beneath," "below," "lower," "above," "upper," and the like, may be used herein for ease of description to describe one element or feature's relationship to another element(s) or feature(s) as illustrated in the FIGURES. Spatially or temporally relative terms may be intended to encompass different orientations of the device or system in use or operation in addition to the orientation depicted in the FIGURES.

Throughout this disclosure, the numerical values represent approximate measures or limits to ranges to encompass minor deviations from the given values and embodiments having about the value mentioned as well as those having exactly the value mentioned. Other than in the working examples provided at the end of the detailed description, all numerical values of parameters (e.g., of quantities or conditions) in this specification, including the appended claims, are to be understood as being modified in all instances by the term "about" whether or not "about" actually appears before the numerical value. "About" indicates that the stated numerical value allows some slight imprecision (with some approach to exactness in the value; approximately or reasonably close to the value; nearly). If the imprecision provided by "about" is not otherwise understood in the art with this ordinary meaning, then "about" as used herein indicates at least variations that may arise from ordinary methods of measuring and using such parameters. For example, "about" may comprise a variation of less than or equal to 5%, optionally less than or equal to 4%, optionally less than or equal to 3%, optionally less than or equal to 2%, optionally less than or equal to 1%, optionally less than or equal to 0.5%, and in certain aspects, optionally less than or equal to 0.1%.

In addition, disclosure of ranges includes disclosure of all values and further divided ranges within the entire range, including endpoints and sub-ranges given for the ranges.

Example embodiments will now be described more fully with reference to the accompanying drawings.

The currently technology relates to over-lithiated positive electroactive materials for use within an electrochemical cell that cycles lithium ions. A typical lithium-ion battery includes a first electrode (such as a positive electrode or cathode) opposing a second electrode (such as a negative electrode or anode) and a separator and/or electrolyte disposed therebetween. Often, in a lithium-ion battery pack, batteries or cells may be electrically connected in a stack or winding configuration to increase overall output. Lithium-ion batteries operate by reversibly passing lithium ions between the first and second electrodes. For example, lithium ions may move from a positive electrode to a negative electrode during charging of the battery, and in the opposite direction when discharging the battery. The electrolyte is suitable for conducting lithium ions and may be in liquid, gel, or solid form. For example, an exemplary and schematic illustration of an electrochemical cell (also referred to as the battery) 20 is shown in FIG. 1.

Such cells are used in vehicle or automotive transportation applications (e.g., motorcycles, boats, tractors, buses, motorcycles, mobile homes, campers, and tanks). However, the current technology may be employed in a wide variety of other industries and applications, including aerospace components, consumer goods, devices, buildings (e.g., houses, offices, sheds, and warehouses), office equipment and furniture, and industrial equipment machinery, agricultural or farm equipment, or heavy machinery, by way of non-limiting example. Further, although the illustrated examples include a single cathode and a single anode, the skilled artisan will recognize that the current teaches extend to various other configurations, including those having one or more cathodes and one or more anodes, as well as various current collectors with electroactive layers disposed on or adjacent to one or more surfaces thereof.

The battery 20 includes a negative electrode 22 (e.g., anode), a positive electrode 24 (e.g., cathode), and a separator 26 disposed between the two electrodes 22, 24. The separator 26 provides electrical separation—prevents physical contact—between the electrodes 22, 24. The separator 26 also provides a minimal resistance path for internal passage of lithium ions, and in certain instances, related anions, during cycling of the lithium ions. In various aspects, the separator 26 comprises an electrolyte 30 that may, in certain aspects, also be present in the negative electrode 22 and positive electrode 24. In certain variations, the separator 26 may be formed by a solid-state electrolyte 30. For example, the separator 26 may be defined by a plurality of solid-state electrolyte particles (not shown).

A negative electrode current collector 32 may be positioned at or near the negative electrode 22, and a positive electrode current collector 34 may be positioned at or near the positive electrode 24. The negative electrode current collector 32 may be a metal foil, metal grid or screen, or expanded metal comprising copper or any other appropriate electrically conductive material known to those of skill in the art. The positive electrode current collector 34 may be a metal foil, metal grid or screen, or expanded metal comprising aluminum or any other appropriate electrically conductive material known to those of skill in the art. The negative electrode current collector 32 and the positive electrode current collector 34 respectively collect and move free electrons to and from an external circuit 40. For example, an interruptible external circuit 40 and a load device 42 may connect the negative electrode 22 (through the negative electrode current collector 32) and the positive electrode 24 (through the positive electrode current collector 34).

The battery 20 can generate an electric current during discharge by way of reversible electrochemical reactions that occur when the external circuit 40 is closed (to connect the negative electrode 22 and the positive electrode 24) and the negative electrode 22 has a lower potential than the positive electrode. The chemical potential difference between the positive electrode 24 and the negative electrode 22 drives electrons produced by a reaction, for example, the oxidation of intercalated lithium, at the negative electrode 22 through the external circuit 40 towards the positive electrode 24. Lithium ions that are also produced at the negative electrode 22 are concurrently transferred through the electrolyte 30 contained in the separator 26 towards the positive electrode 24. The electrons flow through the external circuit 40 and the lithium ions migrate across the separator 26 containing the electrolyte solution 30 to form intercalated lithium at the positive electrode 24. As noted above, electrolyte 30 is typically also present in the negative electrode 22 and positive electrode 24. The electric current passing through the external circuit 40 can be harnessed and directed through the load device 42 until the lithium in the negative electrode 22 is depleted and the capacity of the battery 20 is diminished.

The battery 20 can be charged or re-energized at any time by connecting an external power source to the lithium ion battery 20 to reverse the electrochemical reactions that occur during battery discharge. Connecting an external electrical energy source to the battery 20 promotes a reaction, for example, non-spontaneous oxidation of intercalated lithium, at the positive electrode 24 so that electrons and lithium ions are produced. The lithium ions flow back towards the negative electrode 22 through the electrolyte 30 across the separator 26 to replenish the negative electrode 22 with lithium (e.g., intercalated lithium) for use during the next battery discharge event. As such, a complete discharging event followed by a complete charging event is considered to be a cycle, where lithium ions are cycled between the positive electrode 24 and the negative electrode 22. The external power source that may be used to charge the battery 20 may vary depending on the size, construction, and particular end-use of the battery 20. Some notable and exemplary external power sources include, but are not limited to, an AC-DC converter connected to an AC electrical power grid though a wall outlet and a motor vehicle alternator.

In many lithium-ion battery configurations, each of the negative electrode current collector 32, negative electrode 22, separator 26, positive electrode 24, and positive electrode current collector 34 are prepared as relatively thin layers (for example, from several microns to a fraction of a millimeter or less in thickness) and assembled in layers connected in electrical parallel arrangement to provide a suitable electrical energy and power package. In various aspects, the battery 20 may also include a variety of other components that, while not depicted here, are nonetheless known to those of skill in the art. For instance, the battery 20 may include a casing, gaskets, terminal caps, tabs, battery terminals, and any other conventional components or materials that may be situated within the battery 20, including between or around the negative electrode 22, the positive electrode 24, and/or the separator 26. The battery 20 shown in FIG. 1 includes a liquid electrolyte 30 and shows representative concepts of battery operation. However, the current technology also apply to solid-state batteries that include solid-state electrolytes (and solid-state electroactive particles) that may have a different design, as known to those of skill in the art.

As noted above, the size and shape of the battery 20 may vary depending on the particular application for which it is designed. Battery-powered vehicles and hand-held consumer electronic devices, for example, are two examples where the battery 20 would most likely be designed to different size, capacity, and power-output specifications. The battery 20 may also be connected in series or parallel with other similar lithium-ion cells or batteries to produce a greater voltage output, energy, and power if it is required by the load device 42. Accordingly, the battery 20 can generate electric current to a load device 42 that is part of the external circuit 40. The load device 42 may be powered by the electric current passing through the external circuit 40 when the battery 20 is discharging. While the electrical load device 42 may be any number of known electrically-powered devices, a few specific examples include an electric motor for an electrified vehicle, a laptop computer, a tablet computer, a cellular phone, and cordless power tools or appliances. The load device 42 may also be an electricity-generating apparatus that charges the battery 20 for purposes of storing electrical energy.

With renewed reference to FIG. 1, the positive electrode 24, the negative electrode 22, and the separator 26 may each include an electrolyte solution or system 30 inside their pores, capable of conducting lithium ions between the negative electrode 22 and the positive electrode 24. Any appropriate electrolyte 30, whether in solid, liquid, or gel form, capable of conducting lithium ions between the negative electrode 22 and the positive electrode 24 may be used in the lithium-ion battery 20. In certain aspects, the electrolyte 30 may be a non-aqueous liquid electrolyte solution that includes a lithium salt dissolved in an organic solvent or a mixture of organic solvents. Numerous conventional non-aqueous liquid electrolyte solutions may be employed in the lithium-ion battery 20.

In certain aspects, the electrolyte 30 may be a non-aqueous liquid electrolyte solution that includes one or more lithium salts dissolved in an organic solvent or a mixture of organic solvents. For example, a non-limiting list of lithium salts that may be dissolved in an organic solvent to form the non-aqueous liquid electrolyte solution include lithium hexafluorophosphate ($LiPF_6$), lithium perchlorate ($LiClO_4$), lithium tetrachloroaluminate ($LiAlCl_4$), lithium iodide (LiI), lithium bromide (LiBr), lithium thiocyanate (LiSCN), lithium tetrafluoroborate ($LiBF_4$), lithium tetraphenylborate ($LiB(C_6H_5)_4$), lithium bis(oxalato)borate ($LiB(C_2O_4)_2$) (LiBOB), lithium difluorooxalatoborate ($LiBF_2(C_2O_4)$), lithium hexafluoroarsenate ($LiAsF_6$), lithium trifluoromethanesulfonate ($LiCF_3SO_3$), lithium bis(trifluoromethane) sulfonylimide ($LiN(CF_3SO_2)_2$), lithium bis(fluorosulfonyl) imide ($LiN(FSO_2)_2$) (LiSFI), and combinations thereof.

These and other similar lithium salts may be dissolved in a variety of non-aqueous aprotic organic solvents, including but not limited to, various alkyl carbonates, such as cyclic carbonates (e.g., ethylene carbonate (EC), propylene carbonate (PC), butylene carbonate (BC), fluoroethylene carbonate (FEC)), linear carbonates (e.g., dimethyl carbonate (DMC), diethyl carbonate (DEC), ethylmethylcarbonate (EMC)), aliphatic carboxylic esters (e.g., methyl formate, methyl acetate, methyl propionate), γ-lactones (e.g., γ-butyrolactone, γ-valerolactone), chain structure ethers (e.g., 1,2-dimethoxyethane, 1-2-diethoxyethane, ethoxymethoxymethane), cyclic ethers (e.g., tetrahydrofuran, 2-methyltetrahydrofuran), 1,3-dioxolane), sulfur compounds (e.g., sulfolane), and combinations thereof.

The porous separator 26 may include, in certain instances, a microporous polymeric separator including a polyolefin. The polyolefin may be a homopolymer (derived from a single monomer constituent) or a heteropolymer (derived from more than one monomer constituent), which may be either linear or branched. If a heteropolymer is derived from two monomer constituents, the polyolefin may assume any copolymer chain arrangement, including those of a block copolymer or a random copolymer. Similarly, if the polyolefin is a heteropolymer derived from more than two monomer constituents, it may likewise be a block copolymer or a random copolymer. In certain aspects, the polyolefin may be polyethylene (PE), polypropylene (PP), or a blend of PE and PP, or multi-layered structured porous films of PE and/or PP. Commercially available polyolefin porous separator membranes 26 include CELGARD® 2500 (a monolayer polypropylene separator) and CELGARD® 2320 (a trilayer polypropylene/polyethylene/polypropylene separator) available from Celgard LLC.

In certain aspects, the separator 26 may further include one or more of a ceramic coating layer and a heat-resistant material coating. The ceramic coating layer and/or the heat-resistant material coating may be disposed on one or more sides of the separator 26. The material forming the ceramic layer may be selected from the group consisting of: alumina ($Al_2O_3$), silica ($SiO_2$), and combinations thereof. The heat-resistant material may be selected from the group consisting of: Nomex, Aramid, and combinations thereof.

When the separator 26 is a microporous polymeric separator, it may be a single layer or a multi-layer laminate, which may be fabricated from either a dry or a wet process. For example, in certain instances, a single layer of the polyolefin may form the entire separator 26. In other aspects, the separator 26 may be a fibrous membrane having an abundance of pores extending between the opposing surfaces and may have an average thickness of less than a millimeter, for example. As another example, however, multiple discrete layers of similar or dissimilar polyolefins may be assembled to form the microporous polymer separator 26. The separator 26 may also comprise other polymers in addition to the polyolefin such as, but not limited to, polyethylene terephthalate (PET), polyvinylidene fluoride (PVdF), a polyamide, polyimide, poly(amide-imide) copolymer, polyetherimide, and/or cellulose, or any other material suitable for creating the required porous structure. The polyolefin layer, and any other optional polymer layers, may further be included in the separator 26 as a fibrous layer to help provide the separator 26 with appropriate structural and porosity characteristics. In certain aspects, the separator 26 may also be mixed with a ceramic material or its surface may be coated in a ceramic material. For example, a ceramic coating may include alumina ($Al_2O_3$), silicon dioxide ($SiO_2$), titania ($TiO_2$) or combinations thereof. Various conventionally available polymers and commercial products for forming the separator 26 are contemplated, as well as the many manufacturing methods that may be employed to produce such a microporous polymer separator 26.

In various aspects, the porous separator 26 and the electrolyte 30 in FIG. 1 may be replaced with a solid-state electrolyte ("SSE") (not shown) that functions as both an electrolyte and a separator. The solid-state electrolyte may be disposed between the positive electrode 24 and negative electrode 22. The solid-state electrolyte facilitates transfer of lithium ions, while mechanically separating and providing electrical insulation between the negative and positive electrodes 22, 24. By way of non-limiting example, solid-state electrolytes may include $LiTi_2(PO_4)_3$, $LiGe_2(PO_4)_3$, $Li_7La_3Zr_2O_{12}$, $Li_3xLa_{2/3}$-$xTiO_3$, $Li_3PO_4$, $Li_3N$, $Li_4GeS_4$, $Li_{10}GeP_2S_{12}$, $Li_2S$—$P_2S_5$, $Li_6PS_5Cl$, $Li_6PS_5Br$, $Li_6PS_5I$, $Li_3OCl$, $Li_{2.99}Ba_{0.005}ClO$, or combinations thereof.

The negative electrode 22 comprises a lithium host material that is capable of functioning as a negative terminal of a lithium-ion battery. For example, the negative electrode 22 may comprise a lithium host material (e.g., negative electroactive material) that is capable of functioning as a negative terminal of the battery 20. In various aspects, the negative electrode 22 may be defined by a plurality of negative electroactive material particles (not shown). Such negative electroactive material particles may be disposed in one or more layers so as to define the three-dimensional structure of the negative electrode 22. The electrolyte 30 may be introduced, for example after cell assembly, and contained within pores (not shown) of the negative electrode 22. For example, the negative electrode 22 may include a plurality of electrolyte particles (not shown).

The negative electrode 22 may include a negative electroactive material that is silicon-based comprising silicon, for example, lithium-silicon and silicon containing binary and ternary alloys and/or tin-containing alloys, such as Si—Sn, SiSnFe, SiSnAl, SiFeCo, $SnO_2$, and the like, as well as silicon blended graphites, such as Si/graphite and SiO/graphite.

The negative electroactive material in the negative electrode 22 may be optionally intermingled with one or more electrically conductive materials that provide an electron conductive path and/or at least one polymeric binder material that improves the structural integrity of the negative electrode 22. For example, the negative electroactive material in the negative electrode 22 may be optionally intermingled with binders such as poly(tetrafluoroethylene) (PTFE), sodium carboxymethyl cellulose (CMC), styrene-butadiene rubber (SBR), poly(vinylidene fluoride) (PVDF), nitrile butadiene rubber (NBR), styrene ethylene butylene styrene copolymer (SEBS), styrene butadiene styrene copolymer (SBS), lithium polyacrylate (LiPAA), sodium polyacrylate (NaPAA), sodium alginate, lithium alginate, ethylene propylene diene monomer (EPDM), and combinations thereof. Electrically conductive materials may include carbon-based materials, powder nickel or other metal particles, or a conductive polymer. Carbon-based materials may include, for example, particles of carbon black, graphite, acetylene black (such as KETCHEN™ black or DENKA™ black), carbon fibers and nanotubes, graphene, and the like. Examples of a conductive polymer include polyaniline, polythiophene, polyacetylene, polypyrrole, and the like.

The positive electrode 24 may be formed from a lithium-based active material (or a sodium-based active material in the instance of sodium-ion batteries) that is capable of undergoing lithium intercalation and deintercalation, alloying and dealloying, or plating and stripping, while functioning as the positive terminal of the battery 20. The positive electrode 24 can be defined by a plurality of electroactive material particles (not shown) disposed in one or more layers so as to define the three-dimensional structure of the positive electrode 24. The electrolyte 30 may be introduced, for example after cell assembly, and contained within pores (not shown) of the positive electrode 24. For example, the positive electrode 24 may include a plurality of electrolyte particles (not shown).

One exemplary common class of known materials that can be used to form the positive electrode 24 is layered lithium transitional metal oxides. For example, in certain aspects, the positive electrode 24 may comprise one or more materials having a spinel structure, such as lithium manganese oxide ($Li_{(1+x)}Mn_2O_4$, where $0.1 \leq x \leq 1$) and lithium manganese nickel oxide ($LiMn_{(2-x)}Ni_xO_4$, where $0 \leq x \leq 0.5$) (e.g., $LiMn_{1.5}Ni_{0.5}O_4$).

In certain variations, the positive electroactive materials may be optionally intermingled with an electronically conducting material that provides an electron conduction path and/or at least one polymeric binder material that improves the structural integrity of the electrode. For example, the positive electroactive materials and electronically or electrically conducting materials may be slurry cast with such binders, like polyvinylidene difluoride (PVdF), polytetrafluoroethylene (PTFE), ethylene propylene diene monomer (EPDM) rubber, or carboxymethyl cellulose (CMC), a nitrile butadiene rubber (NBR), styrene-butadiene rubber (SBR), lithium polyacrylate (LiPAA), sodium polyacrylate (NaPAA), sodium alginate, or lithium alginate. Electrically conducting materials may include carbon-based materials, powdered nickel or other metal particles, or a conductive polymer. Carbon-based materials may include, for example, particles of graphite, acetylene black (such as KETCHEN™ black or DENKA™ black), carbon fibers and nanotubes, graphene, and the like. Examples of a conductive polymer include polyaniline, polythiophene, polyacetylene, polypyrrole, and the like. In certain aspects, mixtures of the conductive materials may be used.

As discussed above, during discharge, the negative electrode 22 may contain a comparatively high concentration of intercalated lithium, which is oxidized into lithium ions and electrons. Lithium ions may travel from the negative electrode 22 to the positive electrode 24, for example, through the ionically conductive electrolyte 30 contained within the pores of an interposed porous separator 26. Concurrently, electrons pass through an external circuit 40 from the negative electrode 22 to the positive electrode 24. Such lithium ions may be assimilated into the material of the positive electrode 22 by an electrochemical reduction reaction. The battery 20 may be recharged or regenerated after a partial or full discharge of its available capacity by an external power source, which reverses the electrochemical reactions that transpired during discharge. In various instances, however, especially in instances of silicon-containing electroactive materials, a portion of the intercalated lithium remains with the negative electrode 22 for example, conversion reactions and/or the formation of a solid electrolyte interphase (SEI) layer (not shown) on the negative electrode 22 during the first cycle, as well as ongoing lithium loss due to, for example, continuous solid electrolyte interphase breakage. This permanent loss of lithium ions may result in a decreased specific energy and power in the battery 20. The current technology provides improved electroactive and electrode materials, and methods of making the same, which can address these challenges.

For example, in various aspects, the battery 20 may be lithiated so as to create a lithium reservoir. Electroactive materials (or electrodes incorporating electroactive materials) can be lithiated prior to forming an electrode. In particular, the positive electroactive material can be lithiated prior to the formation of the positive electrode 24. For example, an amount of lithium prelithiation together with appropriate negative electrode capacity and/or positive electrode capacity ratio (N/P ratio) can be used to control electrochemical potential within an appropriate window so as to improve the cycle stability of the battery 20. Prelithiation can drive down the potential for silicon-containing electrodes. In each instance, the reserved lithium can compensate for lithium lost during cycling, including during the first cycle, so as to decrease capacity loss over time The positive electroactive material such as lithium manganese oxide (LMO) may be over-lithiated so as to provide a lithiated reservoir. Over-lithiated lithium manganese oxide (LMO) can be in the form of $Li_xMn_2O_4$, where $1.05 \leq x \leq 1.30$. Such materials can be prepared (e.g., synthesized directly) using common production processes, using common sources such as $Li_2CO_3$, LiOH, $Li_2C_2O_2$, and/or $Li_2SO_4$, but adding additional lithium precursor. Lithium manganese oxide (LMO) is a capacity-limited electrode. However, its full capacity may not be used because of differences in Columbic Efficiencies between the materials of the electrodes 22, 24. Lithium manganese oxide ($LiMn_2O_4$) has a first cycle Columbic Efficiency of greater than about 97%. Over-lithiating the lithium manganese oxide ($Li_xMn_2O_4$, where $1.05 \leq x \leq 1.30$) in accordance with the current technology will decrease the first Columbic Efficiency (e.g., between about 78% and about 95%) so as to help balance the full cell architecture and increase energy density.

For example, the charging profile in such instances can be depicted as:

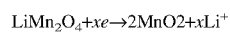

Theoretical charge capacity is represented as:

$$\frac{26.8x}{173.9 + 6.9x}$$

Using this relationship, when x=1, the theoretical capacity is 148 mAh/g; when x=1.05, the theoretical capacity is 155 mAh/g; and when x=1.3, the theoretical capacity is 190 mAh/g.

The discharging profile in such instance can be depicted as:

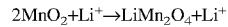

Theoretical discharge capacity when compared to $LiMn_2O_4$ is 148 mAh/g. When x=1, the theoretical first Columbic Efficiency (CE) is 148/148=100%; when x=1.05, the theoretical first Columbic Efficiency (CE) is 148/155=95%; when x=1.3, the theoretical first Columbic Efficiency (CE) is 148/190=78%. Further, when x≥1.12, the theoretical first Columbic Efficiency (CE) is expected to be less than 90%, which matches the first Columbic Efficiency (CE) of silicon that is between about 80% and about 90%. More specifically, in the instances of a battery that comprises a pyrolyzed silicon anode, the anode has a first Columbic Efficiency (CE) of about 90%, and as such, the cathode should include over-lithiated $Li_xMn_2O_4$, where $1.05 \leq x \leq 1.15$. In other instances, where a battery comprises blended silicon/graphite or blended silicon oxide/graphite, the anode has a first Columbic Efficiency (CE) between about 80% and about 82%, and as such, the cathode should include over-lithiated $Li_xMn_2O_4$, where $1.20 \leq x \leq 1.30$.

Certain features of the current technology are further illustrated in the following non-limiting example.

Example

An example cell can be prepared in accordance with various aspects of the present disclosure. The example cell can include an over-lithiated cathode material and a silicon-containing anode material. For example, the example cell may include $Li_xMn_2O_4$, where $1.05 \leq x \leq 1.30$.

A comparative cell can also be prepared. The comparative cell can include a cathode material comprising lithium manganese oxide ($LiMn_2O_4$) and the silicon-containing anode material.

The following table illustrates the certain performance data for example and comparative cells. As illustrated, cells having over-lithiated cathode material and a silicon-containing anode material has improved long-term performance, including, for example, a 10% increase in energy density.

TABLE 1

| Property | Example Cell | Comparative Cell |
|---|---|---|
| Capacity, First Charge (Ah) | 99 | 91 |
| Capacity, First Discharge (Ah) - reversible | 89 | 81 |
| Specific Energy (Wh/Kg) | 228 | 208 |
| Energy Density (Wh/L) | 549 | 499 |
| Specific Energy Increase (Wh/kg) | 20 | — |
| Energy Density Increase (Wh/L) | 50 | — |

Performance of Comparative Cells

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. An electrochemical cell that cycles lithium ions, wherein the electrochemical cell comprises:
    a positive electrode comprising an over-lithiated positive electroactive material comprising $Li_xMn_2O_4$ (where $1.20 \leq x \leq 1.30$) and having a Columbic Efficiency greater than or equal to about 80% to less than or equal to about 82%;
    a negative electrode comprising a silicon-containing negative electroactive material comprising one of blended silicon-graphite and blended silicon oxide-graphite and having a Columbic Efficiency greater than or equal to about 80% to less than or equal to about 90%; and
    an electrolyte disposed between the negative electrode and the positive electrode.

2. The electrochemical cell of claim 1, wherein the over-lithiated positive electroactive material further comprises $Li_xMn_2O_4$, where $1.05 \leq x \leq 1.20$.

3. The electrochemical cell of claim 1, wherein theoretical charge capacity is defined by:

$$\frac{26.8x}{173.9 + 6.9x}.$$

4. An electrochemical cell that cycles lithium ions, wherein the electrochemical cell comprises:
    a positive electrode comprising an over-lithiated positive electroactive material comprising one of $Li_xMn_2O_4$ (where $1.20 \leq x \leq 1.30$) and having a Columbic Efficiency greater than or equal to about 80% to less than or equal to about 82%;
    a negative electrode comprising a silicon-containing electroactive material comprising one of blended silicon-graphite and blended silicon oxide-graphite; and
    an electrolyte disposed between the negative electrode and the positive electrode.

5. The electrochemical cell of claim 4, wherein the over-lithiated positive electroactive material further comprises $Li_xMn_2O_4$, where $1.05 \leq x \leq 1.20$.

6. An electrochemical cell that cycles lithium ions, wherein the electrochemical cell comprises:
    a positive electrode comprising an over-lithiated positive electroactive material comprising $Li_xMn_2O_4$, where $1.20 \leq x \leq 1.30$ and having a first Columbic efficiency greater than or equal to about 80% to less than or equal to about 82%;
    a negative electrode comprising a silicon-containing electroactive material comprising one of a blended silicon-graphite and a blended silicon-oxide graphite and having a second Columbic Efficiency, wherein the first and second Columbic Efficiencies are the same; and
    an electrolyte disposed between the negative electrode and the positive electrode.

7. The electrochemical cell of claim 6, wherein the over-lithiated positive electroactive material further comprises $Li_xMn_2O_4$, where $1.05 \leq x \leq 1.30$.

8. The electrochemical cell of claim 6, wherein the over-lithiated positive electroactive material further comprises $Li_xMn_2O_4$, where $1.05 \leq x \leq 1.20$.

9. The electrochemical cell of claim 6, where the over-lithiated positive electroactive material further comprises $LiMn_{(2-x)}Ni_xO_4$ (where $0 \leq x \leq 0.5$).

10. The electrochemical cell of claim 1, wherein the over-lithiated positive electroactive material further comprises $LiMn_{(2-x)}Ni_xO_4$, where $0 \leq x \leq 0.5$.

11. The electrochemical cell of claim 4, wherein the over-lithiated positive electroactive material further comprises $LiMn_{(2-x)}Ni_xO_4$, where $0 \leq x \leq 0.5$.

* * * * *